(12) United States Patent
Zanni et al.

(10) Patent No.: US 8,152,910 B2
(45) Date of Patent: Apr. 10, 2012

(54) MODULAR GAS-SEPARATING ADSORBERS

(75) Inventors: Giovanni Zanni, Grosseto (IT); Oscar R. L. De Groen, Grosseto (IT)

(73) Assignee: IGS Italia S.r.l., Grosseto (IT)

( * ) Notice: Subject to any disclaimer, the term of this patent is extended or adjusted under 35 U.S.C. 154(b) by 123 days.

(21) Appl. No.: 12/012,090

(22) Filed: Jan. 31, 2008

(65) Prior Publication Data
US 2009/0193774 A1 Aug. 6, 2009

(30) Foreign Application Priority Data
Oct. 9, 2007 (IT) .............................. MI2007A1944

(51) Int. Cl.
*B01D 53/04* (2006.01)

(52) U.S. Cl. ................ 96/133; 96/121; 96/147; 96/149; 96/151

(58) Field of Classification Search ................ 55/484; 96/121, 129, 131, 133, 136, 138, 147, 151, 96/149
See application file for complete search history.

(56) References Cited

U.S. PATENT DOCUMENTS

| | | | | |
|---|---|---|---|---|
| 3,654,960 A * | 4/1972 | Kiernan | ........................ | 137/884 |
| 4,735,505 A * | 4/1988 | deMey et al. | ................. | 356/451 |
| 5,827,354 A * | 10/1998 | Krabiell et al. | .................... | 95/96 |
| 5,950,661 A * | 9/1999 | Kirchhoff-Stewens | ....... | 137/269 |
| 6,190,441 B1 * | 2/2001 | Czabala et al. | ................. | 96/130 |
| 6,311,719 B1 * | 11/2001 | Hill et al. | ....................... | 137/312 |
| 6,457,485 B2 * | 10/2002 | Hill et al. | ....................... | 137/240 |
| 6,712,087 B2 * | 3/2004 | Hill et al. | ....................... | 137/240 |
| 6,918,953 B2 * | 7/2005 | Lomax et al. | .................... | 96/130 |
| 7,618,481 B2 * | 11/2009 | Wu | ................................. | 96/121 |
| 7,635,430 B2 * | 12/2009 | Mildren et al. | ............ | 210/512.1 |
| 2009/0020014 A1 * | 1/2009 | Lomax et al. | .................... | 96/116 |

* cited by examiner

Primary Examiner — Robert Clemente
(74) Attorney, Agent, or Firm — Kirchstein, et al.

(57) ABSTRACT

In a modular gas-separating adsorber assembly, a pair of cylindric vessels, filled-in by a given amount of an adsorbing material (either a mainly adsorbing or a mainly adsorbing material) are always operatively assembled with a top plate and a bottom plate, the top and bottom plates being mutually coupled by tie rods, engaged in the plate corners, the bottom plates and top plates forming plate chambers and being operatively connected with the chamber formed by adjoining cylindric vessel, the plates having projecting fittings to be assembled with the plate chambers included in adjoining vessels.

8 Claims, 5 Drawing Sheets

MODULAR GAS-SEPARATING ADSORBERS

BACKGROUND OF THE INVENTION

The present invention relates to a modular gas adsorber assembly. Prior gas adsorbers conventionally comprise metal vessels which are filled-in by a given amount of an adsorbing material forming, inside the vessel, a sieve, allowing to separate one or more gases from a gas mixture, to provide, at the outlet of the vessel, a new and different gas mixture based on preset parameters, and free of other undesired substances, based on the type of used process and adsorbing material. Said prior adsorbers have the drawback that they are made with a preset constructional volume, dependent on the amount and purity of the end gas stream. Thus, said prior adsorbers must be specifically designed depending on a client requirement, which requires a comparatively high designing labor and use of different adsorbing materials, for meeting said well defined client requirements.

SUMMARY OF THE INVENTION

Accordingly, the aim of the present invention is that of overcoming the mentioned drawbacks of the prior art and providing adsorbers which can be assembled in a series or tandem relationship and may be moreover fitted to the client requirements without mechanical operations and constructional modifications.

According to the present invention, the above aim is achieved by a modular gas adsorber assembly, in which a pair of cylindric vessels filled-in by a given amount of adsorbing material are respectively operatively assembled with a top plate and a bottom plate, said top and bottom plates being mutually coupled by a coupling tie-rod, engaged in corner portions of said plates, said bottom plates and top plates forming plate chambers and being operatively connected to a further chamber formed by adjoining said cylindric vessels, said plates including projecting fittings to be assembled with the plate chambers of adjoining vessels.

BRIEF DESCRIPTION OF THE DRAWINGS

The subject matter according to the present invention will be disclosed in a more detailed manner hereinafter with reference to an exemplary embodiment thereof, which is shown in the accompanying drawings, where.

DESCRIPTION OF THE PREFERRED EMBODIMENTS

Figure 1:
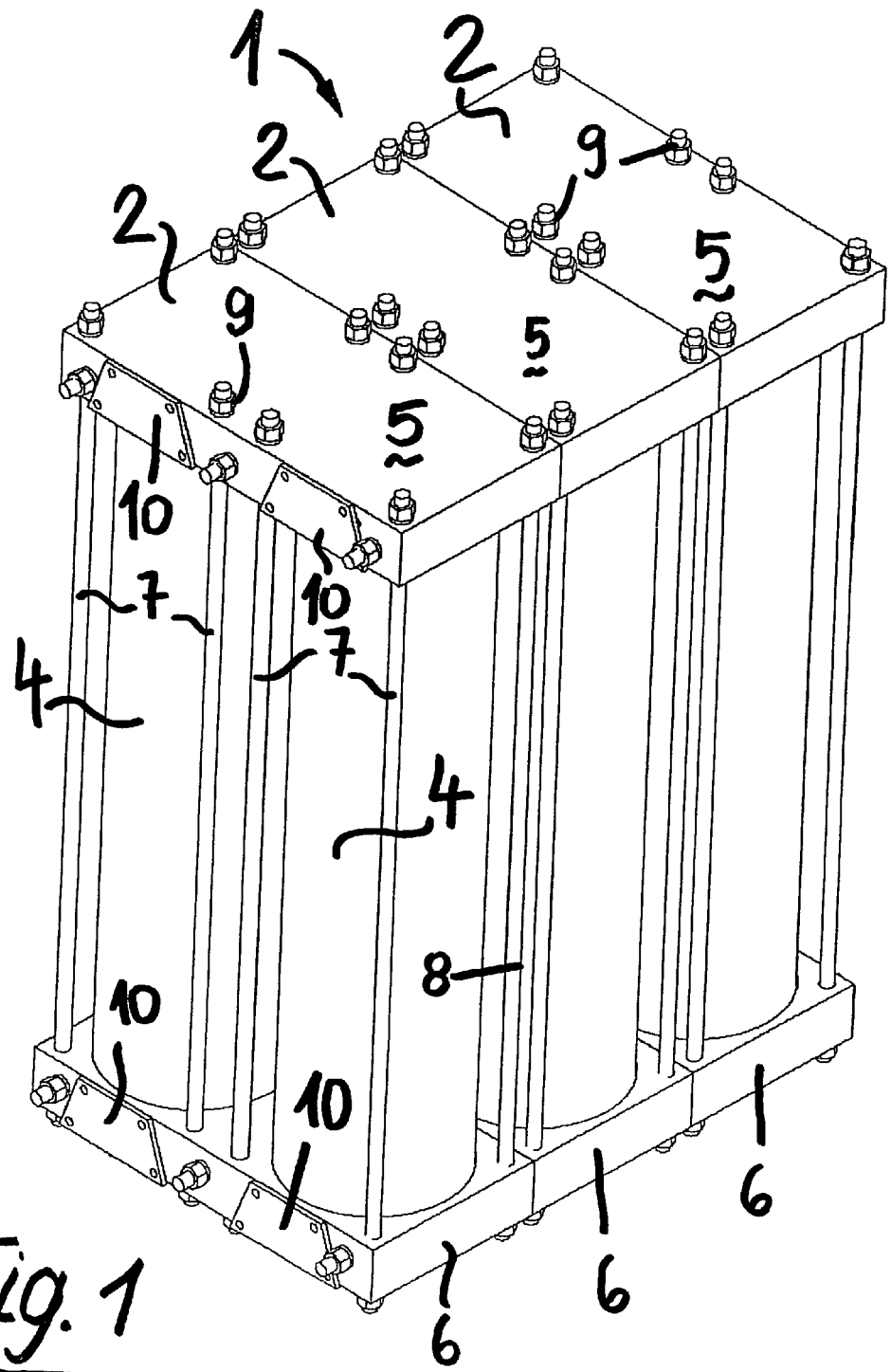
FIG. 1 is a perspective view showing pairs of adsorbers coupled to form an adsorber assembly.

As shown in FIG. 1, the adsorber assembly 1 according to the present invention comprises, for example, three operatively coupled adsorber units 2.

In this connection it should be apparent that such a number of three units 2 is not limitative, and it could also be either increased or decreased.

Each unit 2 substantially comprises two cylindric vessels 4 holding a gas separating material, to provide a new gaseous product.

Each separating unit 2 assembly comprises a top plate 5 and a bottom supporting plate 6, said plates 5 and 6 enclosing therebetween said cylindric vessels 4.

To provide a strong overall construction, the top plates 5 and bottom plates 6 are coupled by threaded tie-rods 7 and 8 which are engaged at corner portions of the plates 5 and 6.

Said threaded tie-rods 7 and 8 are clamped, with respect to said plates 5 and 6, by clamping threaded nuts 9, which are clearly shown in FIG. 1.

The gas mixture inlet, respectively gas outlet, ports are shut-off at an end unit 2, by shut-off plates 10, which are threaded to the bodies of the coupling plates 5 and 6.

Figure 2:
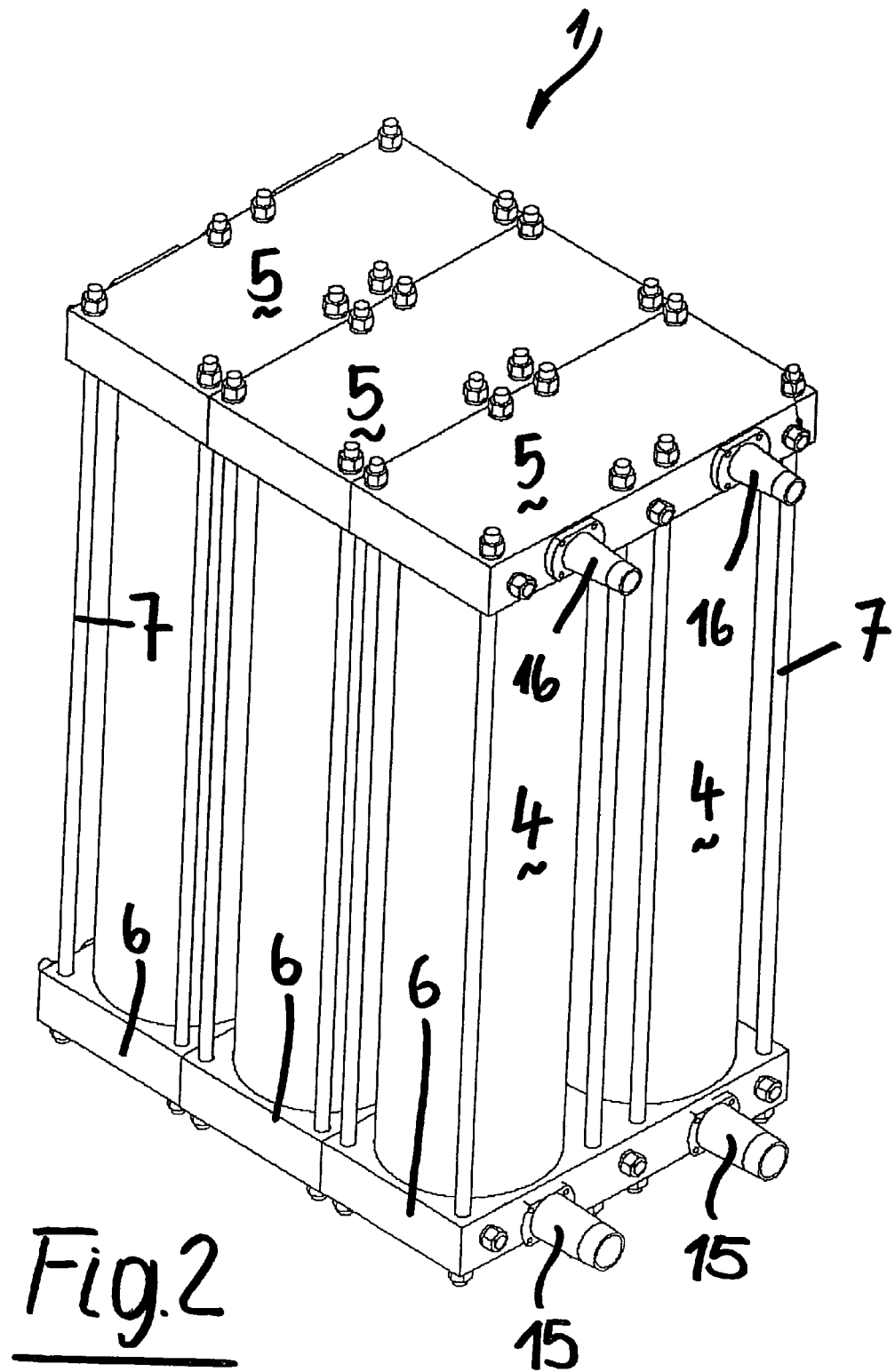
FIG. 2 is a further perspective view of the adsorber assemblies, including inlet fittings for the gas mixture to be processed, and gas outlet fittings.

FIG. 2 clearly shows the adsorber assembly 1 and pairs of vessels 4 arranged or enclosed between said top plates 5 and bottom plates 6.

Moreover, FIG. 2 also shows the gas mixture inlet fittings 15 and the new gas mixture outlet fittings 16 arranged at the top plates 5.

Said FIG. 2 also shows the coupling tie-rods 7 for arranging the vessels 4 between said top 5 and bottom plates 6.

Figure 3:
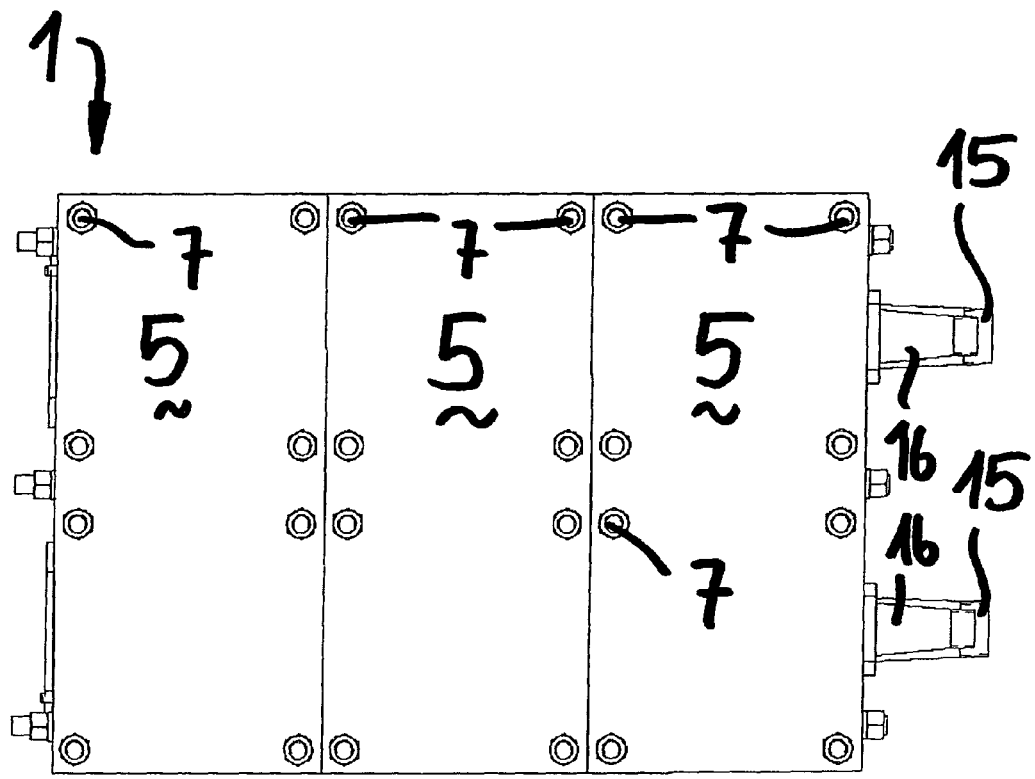
FIG. 3 is a top plan view of an adsorber assembly.

FIG. 3 is a top plan view showing the unit 1 including a plurality of adsorber pairs.

It is possible to clearly see herein that the coupling top plates 5 are connected, through the coupling tie-rods 7 with the bottom plate 6, not shown in FIG. 3. The inlet fittings 15 and outlet fittings 16 are moreover herein shown.

Figure 4:
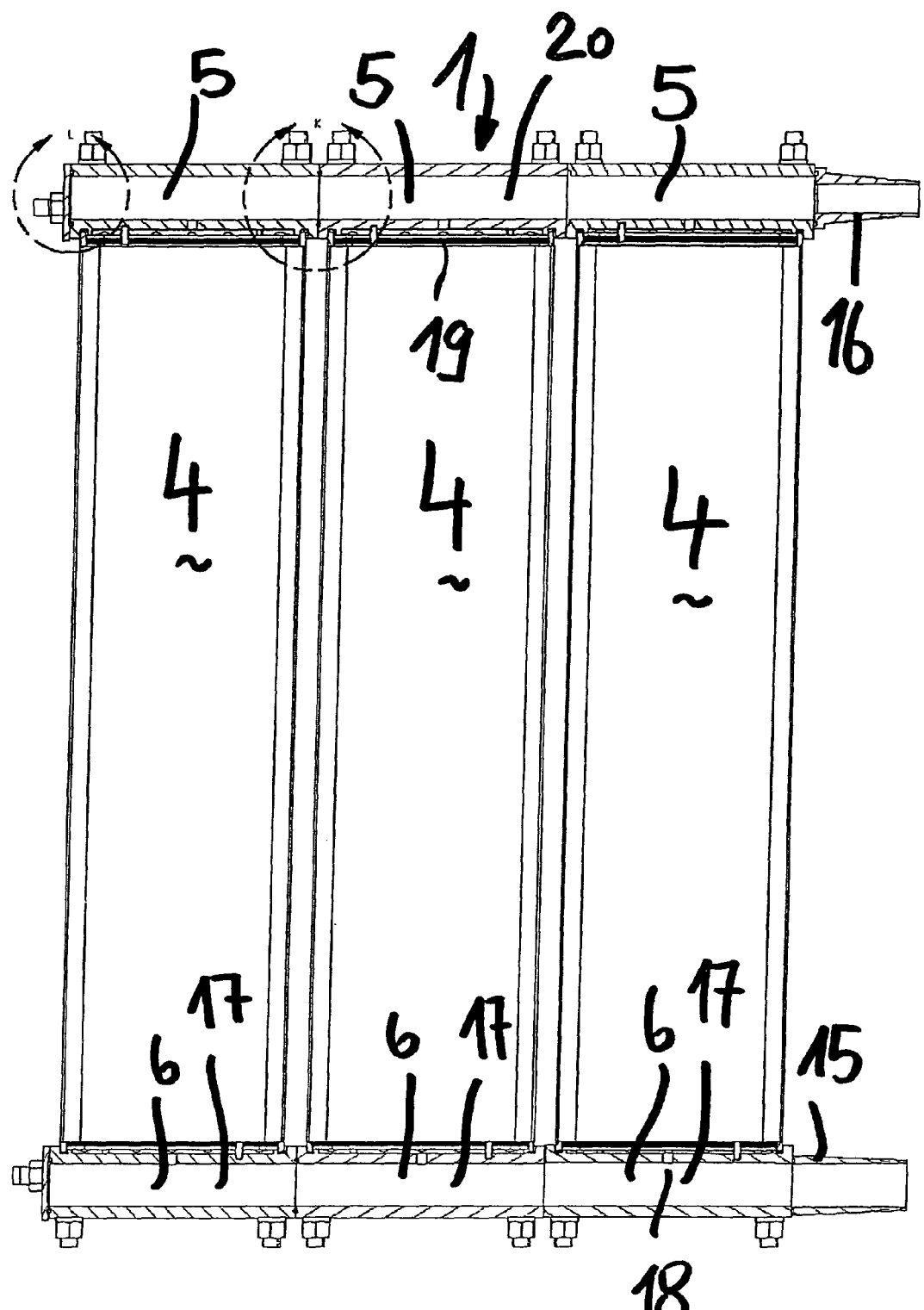
FIG. 4 is a vertical cross-sectional view of said adsorber assembly.

FIG. 4 is a cross-sectional view showing the adsorber unit 1. In particular, this figure clearly shows the vessels 4 filled-in by the adsorbing material operating as a sieve and the cross-sectioned top 5 and bottom plates 6, as well as an inlet fitting 15 for feeding the gas mixture and an outlet fitting 16 for ejecting the newly made gas mixture.

Each bottom plate 6 comprises a chamber 17, and the chambers 17 of said units 2 communicate with one another, and also communicate, through small ports 18, with the inside of the vessel 4.

Each vessel 4 communicates in turn, through the holes 19, with respective chambers 20 defined in the top plates 5, operatively connected to the sleeve 16.

Figure 5:
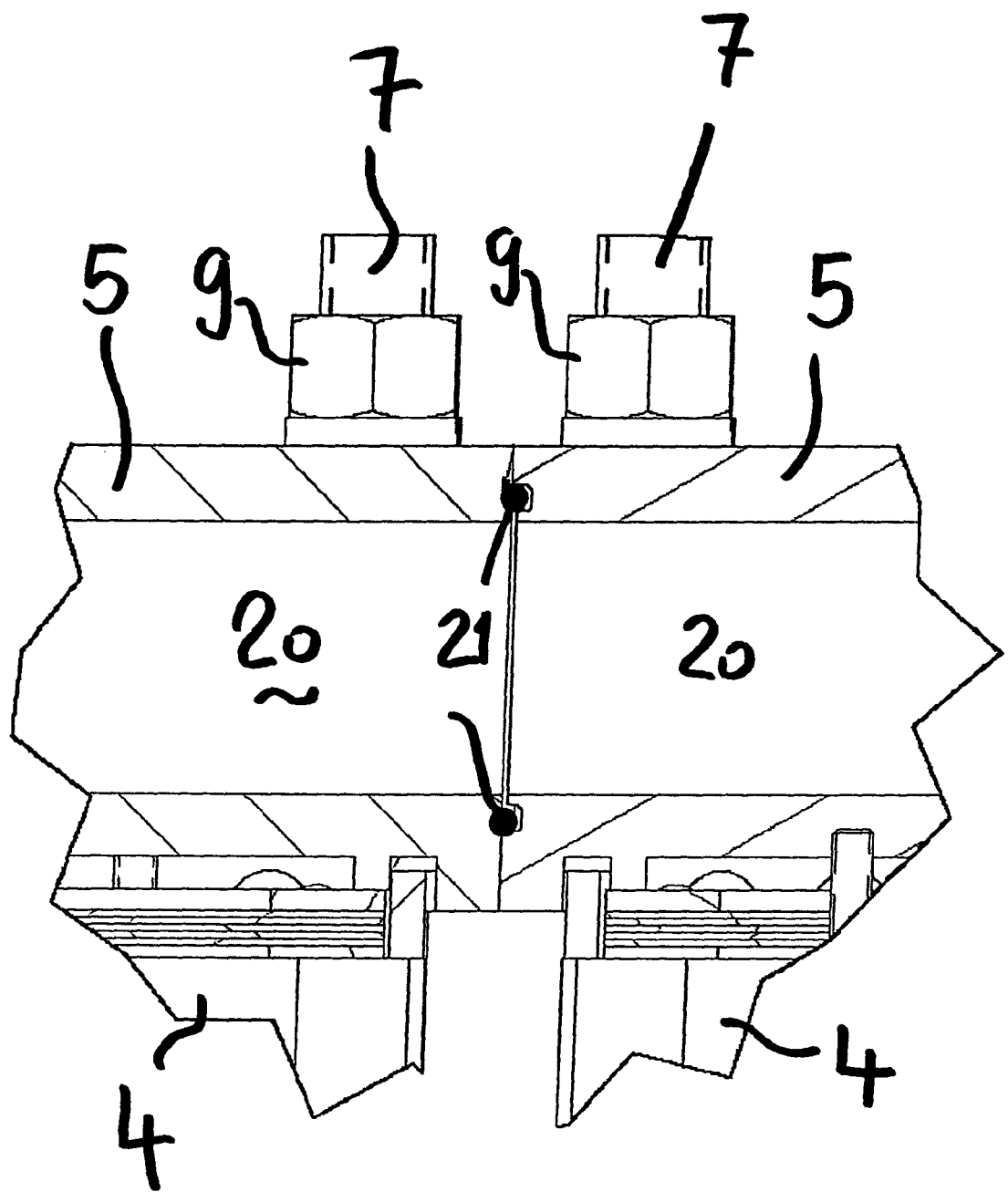
FIG. 5 shows a detail of two adsorbers, illustrated in cross-section at a joining zone thereof.

FIG. 5 is a detail view showing a detail of the top zone of two mutually coupled plates 5.

In particular, said figure shows the threaded tie-rods 7, which, by threaded nuts 9, clamp the top plates 5 to the bottom plates 6.

FIG. 5 also shows the mutually communicating chambers 20, to which the newly made gas mixture, obtained by causing gas to pass through the vessels 4 filled-in by said sieve operating adsorbing material, is supplied.

To prevent gas to be conveyed to the outlet fitting 16 from exiting the adjoining chambers 20 of the top plates 5, gaskets 21 advantageously comprising schematically shown OR sealing elements are arranged between the sheet metal elements forming the top plates 5.

The invention claimed is:

1. A modular gas adsorber assembly, comprising:
    a plurality of adjoining modules arranged in succession along a row having opposite end regions,
    each module including an identical plurality of vessels having interiors that contain a gas adsorbing material, an identical top plate spanning top portions of the plurality of vessels of each module and having an identical top plate chamber in gaseous communication with the interiors of the plurality of vessels of each module, and an identical bottom plate spanning bottom portions of the plurality of vessels of each module and having an identical bottom plate chamber in gaseous communication with the interiors of the plurality of vessels of each module, the top plate and the bottom plate of each module being interconnected, the top plates of successive adjoining modules abutting and directly contacting each other, the bottom plates of the successive adjoining modules abutting and directly contacting each other, the top plate chambers of the successive adjoining modules being in gaseous communication with each other through constantly-open, mutually aligned, top ports extending through the abutting top plates, the bottom plate chambers of the successive adjoining modules being in gaseous communication with each other through constantly-open, mutually aligned, bottom ports extending through the abutting bottom plates, a plurality of top gas seals between the abutting top plates of the successive adjoining modules for sealing the top ports to enable gaseous communication among the top plate chambers of all the successive adjoining modules, a plurality of bottom gas seals between the abutting bottom plates of the successive adjoining modules for sealing the bottom ports to enable gaseous communication among the bottom plate chambers of all the successive adjoining modules, a gas inlet fitting extending outwardly from the bottom port of one of the bottom plates at one end region of the row of successive adjoining modules for enabling admission of a pre-adsorption gaseous mixture into the interiors of all of the vessels, a gas outlet fitting extending outwardly from the top port of one of the top plates at the same one end region of the row of successive adjoining modules for enabling discharge of a post-adsorption gaseous mixture from the interiors of all of the vessels, a top gas shut-off plate for closing the top port of another of the top plates at the opposite end region of the row of successive adjoining modules, the top gas shut-off plate being planar and exteriorly overlying the other top plate outside of the top plate chamber, and a bottom gas shut-off plate for closing the bottom port of another of the bottom plates at the same opposite end region of the row of successive adjoining modules, the bottom gas shut-off plate being planar and exteriorly overlying the other bottom plate outside of the bottom plate chamber.

2. The modular gas adsorber assembly of claim 1, wherein each module includes a pair of the vessels, and wherein each vessel has a cylindrical shape.

3. The modular gas adsorber assembly of claim 1, wherein each top plate and bottom plate of each module has a rectangular shape.

4. The modular gas adsorber assembly of claim 1, wherein each top plate and bottom plate of each module are interconnected by a plurality of threaded tie-rods and threaded nuts.

5. The modular gas adsorber assembly of claim 1, wherein each top and bottom gas seal is a gasket.

6. The modular gas adsorber assembly of claim 1, wherein the gas inlet fitting and the gas outlet fitting extend in mutual parallelism away from the one end region of the row of successive adjoining modules.

7. The modular gas adsorber assembly of claim 1, wherein the gas inlet fitting includes a pair of projecting inlets that extend in mutual parallelism outwardly of the one bottom plate at the one end region of the row of successive adjoining modules, and wherein the gas outlet fitting includes a pair of projecting outlets that extend in mutual parallelism outwardly of the one top plate at the same one end region of the row of successive adjoining modules.

8. The modular gas adsorber assembly of claim 1, wherein the top gas shut-off plate is threaded to the other top plate, and wherein the bottom gas shut-off plate is threaded to the other bottom plate.

* * * * *